United States Patent [19]
Kennedy, Jr. et al.

[11] Patent Number: 5,992,905
[45] Date of Patent: Nov. 30, 1999

[54] BREECH LOCK FITTING JOINT

[75] Inventors: Harold Kennedy, Jr., Morrisville, N.C.; Toshiyuki Sato, Osaka, Japan

[73] Assignee: Suiken + Kennedy, LLP, Cary, N.C.

[21] Appl. No.: 09/055,879

[22] Filed: Apr. 7, 1998

[51] Int. Cl.⁶ .................................................. F16L 19/00
[52] U.S. Cl. ............................................ 285/337; 285/374
[58] Field of Search .................................. 285/322, 323, 285/337, 353, 373, 374, 376, 377

[56] References Cited

U.S. PATENT DOCUMENTS

| | | |
|---|---|---|
| 261,191 | 7/1882 | Walker . |
| 795,977 | 8/1905 | Hogan . |
| 807,417 | 12/1905 | Caskey ................................ 285/377 X |
| 906,217 | 12/1908 | Gaylord . |
| 1,195,433 | 8/1916 | Bailey . |
| 2,138,135 | 11/1938 | Boucher . |
| 2,935,342 | 5/1960 | Seamark . |
| 3,219,364 | 11/1965 | Wooldridge . |
| 3,480,300 | 11/1969 | Jeffery et al. . |
| 3,480,302 | 11/1969 | Jeffery et al. . |
| 3,765,706 | 10/1973 | Bram . |
| 3,858,910 | 1/1975 | Oetiker ................................ 285/376 X |
| 3,920,270 | 11/1975 | Babb, Jr. . |
| 4,402,531 | 9/1983 | Kennedy, Jr. . |
| 4,417,754 | 11/1983 | Yamaji et al. . |
| 5,071,175 | 12/1991 | Kennedy, Jr. . |
| 5,190,224 | 3/1993 | Hamilton ........................... 285/376 X |
| 5,398,980 | 3/1995 | Hunter et al. . |

OTHER PUBLICATIONS

U.S. Pipe, "Field Lok™ Gasket System 4"–12", 1984 Edition, pp. 4–41–4–47.

American Water Works Association (ANSI/AWWA C111/A21.19–90), "American National Standard for Rubber–Gasket Joints for Ductile–Iron Pressure Pipe and Fittings", Dec. 7, 1990 pp. 5, 8, 15, and 190.

*Primary Examiner*—Janet M. Wilkens
*Assistant Examiner*—Karlena D. Schwing
*Attorney, Agent, or Firm*—Nikaido, Marmelstein, Murray & Oram LLP

[57] ABSTRACT

A pipe joint for connecting a plain pipe end. The joint has a bell which has a socket defined therein. The socket includes an axis, a conical surface, a first cylindrical surface of smaller diameter extending from one end of the conical surface, a bottom of the socket adjacent the first cylindrical surface for seating the pipe end, and a second cylindrical surface of larger diameter extending from the other end of the conical surface. A gasket is disposed adjacent the conical surface prior to sealing with the conical surface acting as a gasket seat during sealing of the gasket. A gland is provided and has a radially extending handle for rotating the gland from outside the bell. A breech lock mechanism is provided which includes internal segments on the second cylindrical surface of the socket and corresponding, cooperating external segments on the gland, the internal and external segments having matching, mirrored inclined plane surfaces for engagement with each other. The engagement of the inclined surfaces of the internal and external segments of the breech lock mechanism and rotation of the means causes axial movement of the gland relative to the socket. A thrust restraining grip ring can be provided in an annular tapered cavity on in inner circumferential surface of the gland ring. The bell can have a radially extending handle which the gland handle can abut.

27 Claims, 5 Drawing Sheets

BREECH LOCK FITTING JOINT

BACKGROUND OF THE INVENTION

This invention is a joint to be used with pipe or fittings for water and sewer systems and the like. However, it is specifically designed for use with fittings. The major objective of the invention is to provide a reliable seal with an improved assembly method with the incorporation of a restraint system.

Over the last century at least, many different systems for forming a pipe joint or fitting having a joint have been developed, especially for pipes of larger diameter. Generally, these joints are of the bell and spigot type. Two main types are in use today with some variants. These are the push-on joint fitting and the mechanical joint fitting. They are readily understandable by the manner in which they are assembled.

The assembly process of prior known systems is as follows:

Push-On Joint Fittings: (See for example, U.S. Pat. No. 3,963,298 and U.S. Pipe, Field Lok™ brochure) The pipe end and the socket are first cleaned, removing any debris or paint build-up. The gasket, which is usually shipped separately, is then placed inside the socket in the gasket seat by looping the gasket and forcing it into place, compressing the gasket slightly in the circumferential direction which causes the gasket to remain in place.

The plain end of the pipe must then be provided with a beveled or tapered end in order to push it past the gasket in the fitting. A pipe, which can be cut in the field, must have its end beveled by grinding prior to insertion into the socket.

It is now necessary to attach a jacking mechanism to the pipe end and the fitting bell in order to force the tapered end of the pipe past the gasket until the pipe bottoms out in the socket. It takes a considerable force to insert the pipe end past the gasket and with short lengths of pipe, control during the insertion becomes quite a problem. The short piece of pipe tends to buckle out of alignment during the force application, hence the necessity for complicated special rigging to provide this force in a controlled way.

In order to reduce the force required, the beveled end of the pipe and the gasket surface in the socket are now lubricated with a soft soap.

The pipe end is then placed carefully into the socket, placing the beveled end on the gasket surface. The pipe end is then jacked into the socket to the depth marked on the pipe surface. The jacks are then removed.

In some cases, joint restraint is provided by special gaskets with steel clips, molded into the gasket. In these cases, the joint must be jacked in the reverse direction after assembly to insure that the clips have locked onto the pipe. If disassembly is necessary, thin shims must be hammered into the joint to lift the clips out of their locked positions prior to jacking the joint apart with the special rigging.

The assembly of these previously known push-on fittings can be a complicated and somewhat time consuming process. For this reason, the major portion of the fittings market is not push-on joint fittings, but rather mechanical joint fittings.

Mechanical. Joint Fittings: As stated above, the majority of the fittings used in the United States are provided with the Standardized Mechanical Joint conforming to the requirements of ANSI/AWWA C111/A21.11, "Rubber-Gasket Joints for Ductile-iron Pressure Pipe and Fittings".

The mechanical joint consists of a tapered gasket seat, a tapered or "wedge shaped" gasket, and a follower ring or "gland". Both the bell of the fitting and the gland are provided with a flange having axial bolt holes. While regular bolts can be used, special "T-Bolts" are generally used to connect the gland to the bell of the fitting. The number of bolts required depends upon the size of the pipe, ranging from four, on the 3-inch size, and eight, on the 12-inch size, to thirty-two on the 48-inch size pipe.

In assembling the joint, the pipe end and socket are first cleaned. The gland is then placed over the plain end of the pipe with its special compression "lip" pointing toward the end of the pipe. The gasket is then lubricated and stretched over the end of the pipe with its tapered surface toward the end of the pipe. No bevel on the pipe is required. The plain end is then inserted into the socket of the fitting until the end bottoms out in the socket. No special rigging is required. The gasket is then brought forward and inserted into the gasket seat, caulking or pounding it into place if necessary. The gland is now brought into position touching the gasket, and the T-bolts are inserted into the holes of the fitting bell and through the holes in the gland. The nuts are screwed onto the bolts and tightening begins. The bolts must be tightened in a "star" pattern, in order to maintain alignment during tightening. First tightening one bolt then the opposite bolt, 180 degrees from the first, then the bolt 90 degrees from the last one, and so on, until all bolts have at least 75 to 90 ft.-lb. placed on them for sizes 3-inch through 24-inch and more for the larger sizes. This is an arduous and time consuming task and requires experience, skill, and strength on the part of the worker.

A phenomenon exists during the tightening of the T-bolts which makes the task of bringing all bolts within a range of 75 to 90 ft.-lb. of torque very frustrating. As one bolt is tightened, bringing the gland closer to the bell, the adjoining bolts loosen. That is, as tightening proceeds, a bolt is brought to 75 ft.-lb., the next bolt is also brought to 75 ft.-lb., and so on, until all of the bolts have been tightened at least once, the first bolt is then checked, only to find that it is extremely loose. The act of tightening all bolts, even in a star pattern, has loosened some of the bolts. The bolts must be tightened and re-tightened until all bolts are within the range of torque specified. This may ordinarily take five or more repetitions before the torque on all bolts is stabilized.

A second frustrating experience is that after tightening, if the joint is left for about thirty minutes, the bolts will loose torque, due to what is commonly referred to as "cold flow" of the gasket. Although if the original torque level was above the 75 ft.-lb. level the joint will not ordinarily leak, the fact of the loss of torque makes determining the cause of a leak very confusing. It is often very difficult to determine if the bolts were or were not tightened properly.

Most fittings are also installed in a trench, making access to the bolts on the bottom of the joint a problem. The most frequent complaint is a leaky joint caused by loose bolts on the bottom of the joint usually due to the difficulty of getting to these bolts.

One benefit of a mechanical joint is that the joint requires no unusual equipment to assemble. Secondly, if a mistake is made, the mistake at least can be remedied since disassembly is reasonably simple. Disassembly of a push-on joint is complicated, requiring special tools, and often results in having to cut the pipe in order to undo the joint. Although it requires skill and some strength to assemble the mechanical joint, mistakes can be corrected and the use of simple tools has kept the mechanical joint the most used joint for fittings.

Other variants of pipe joints and fittings exist. The prior art patents describe two mechanisms having somewhat similar actions. One is referred to as a "Bayonet locking ring". This bayonet ring is a gland ring having integral protruding segments on its outer surface which interact with like integral segments in the bell of a pipe to retain the ring in the bell. This bayonet ring imparts no forward motion and can usually be rotated by hand. This mechanism is referenced in Bram, U.S. Pat. No. 3,765,706, Oct. 16, 1973. The second mechanism is a "Breech Lock" ring also having integral protruding segments on its outer surface which interact with like segments in the bell to retain the gland ring and also impart forward motion when the ring is rotated. These segments have an inclined surface and can either be an interrupted single thread screw or separate and wedge-like. In this invention, the segments are separate and wedge-like. The breech lock ring is usually used also to compress some type of gasket and must be tightened using more force than can be applied by hand. It can be seen in Kennedy, U.S. Pat. No. 4,402,531, Sep. 6, 1983.

OBJECTS AND SUMMARY OF THE INVENTION

The first object of this invention is to provide a joint for fittings which can be assembled and taken apart easily with simple tools, requiring little skill and strength, and which will also provide a reliable "O-ring" type seal.

A second object of the invention is to provide a joint which includes a means of visual inspection to determine if the joint has been properly assembled.

A third object of this invention is to make the bolt or bolts used for assembly always easily accessible to the person assembling the joint.

A fourth object of this invention is to provide an easily assembled fitting joint which is restrained against separation due to internal hydraulic pressure.

In order to accomplish the above and other objects, the present invention is pipe joint for connecting a plain pipe end comprising certain particular structure. A bell is provided with a socket defined therein, the socket including an axis, a conical surface, a first cylindrical surface of smaller diameter extending from one end of the conical surface, a bottom of the socket adjacent the first cylindrical surface for seating the pipe end, and a second cylindrical surface of larger diameter extending from the other end of the conical surface. A gasket is disposed adjacent the conical surface prior to sealing, the conical surface acting as a gasket seat during sealing of the gasket. A gland or gland ring as it can be called is provided having a means for rotating the gland from outside the bell. The means can be a radially extending handle. A breech lock mechanism is provided including internal segments on the second cylindrical surface of the socket and corresponding, cooperating external segments on the gland, the internal and external segments having matching, mirrored inclined plane surfaces for engagement with each other, wherein with engagement of the inclined surfaces of the internal and external segments of the breech lock mechanism, rotation of the means causes axial movement of the gland relative to the socket.

The pipe joint according to the present invention can further comprise a radially extending handle on the bell positioned such that at a fully engaged position of the breech lock mechanism, the gland handle abuts the bell handle. The gland handle can extend further radially than the bell handle.

The means for rotating the gland from outside the bell can further comprise a circumferentially extending cut-out in the second cylindrical surface of the bell with the gland handle extending radially through the cut-out. The cut-out can be positioned adjacent the bell handle.

The pipe joint according to the present invention can further comprise a spacer/spreader attached to the gland handle and engaging a surface of the cut-out. The spacer/spreader can be sized sufficiently in a circumferential direction of the bell to prevent the breech lock mechanism from being disengaged. This enables simple easy shipping of the pipe joint with all of the parts present and yet there being no worry as to unintentional disassembly.

The pipe joint according to the present invention can have the gasket be an O-ring. Such an O-ring would have an outside diameter about the same as an inside diameter of the second cylindrical surface of the socket, whereupon before assembly of the joint, the O-ring is pre-compressed and forces the gland axially outward until the external segments on the gland axially contact the internal segments of the socket, keeping the gland in an open position ready to receive the pipe end. The O-ring preferably has an inside diameter and inside circumference greater than an inside diameter and inside circumference of the gland. The inside diameter and inside circumference of the gland are preferably greater than an outside diameter and circumference of the pipe end.

The conical surface of the socket can have a taper of substantially 30° from the axis of the socket. The gland can have a gland end face at an end adjacent the conical surface, having a taper of substantially 30° from a plane perpendicular to the axis of the socket. The conical surface and the gland end face when abutting form a right angle and a gasket seat. The O-ring is compressed substantially 30% in the gasket seat.

The pipe joint according to present invention further comprises a grip ring. The gland has an annular cavity on an inside circumferential surface of the gland, the annular cavity being larger in diameter toward an end face of the gland and tapering toward a smaller diameter at the rear of the gland. The grip ring is inserted into the annular cavity. The grip ring is split circumferentially at one location only and has, in a relaxed condition, an inner diameter preferably slightly smaller in diameter than the outer diameter of the pipe end. The grip ring can be round in cross-section and have axially spaced, thread-like teeth on an inside circumferential surface, the teeth having a tapered surface on a side towards the outside of the joint and a perpendicular surface on the opposite axial side.

The gland can have a circumferentially extending slot therein adjacent the gland handle with the annular cavity having a stop member therein. One end of the grip ring rests against the stop member and the other end is positioned under the slot when the ring is in place. The spacer/spreader attached to the gland handle can extend into the slot engaging the other end of the grip ring expanding the grip ring to an inner diameter larger than an outer diameter of the pipe end. The stop member can be an axially oriented, radially extending rib formed as an integral part of the gland, the one end of the grip ring being in a radial plane of the grip ring and positioned against the rib. The other end of the grip ring can be tapered with the spacer/spreader having a spreader end portion which extends through the slot and hooks the tapered end of the grip ring.

In another aspect of the present invention, a pipe fitting is provided for connecting a plain pipe end, the fitting comprising a body portion and at least one joint, with the joint having the structure summarized above. The pipe fitting for connecting a plain pipe end can comprise at least two of the joints.

In a yet further aspect of the invention, the invention can be an improvement in a pipeline extending in a substantially horizontal plane, the pipeline including a pipe having plain ends, and at least one pipe fitting for connecting to one plain pipe end. The improvement would comprising the fitting comprising a body portion and at least one joint with the joint also comprising the body portion of the fitting having a vertical center line and central axis. The gland handle of the joint and the bell handle, when the joints are fully assembled, being positioned at a top of the vertical center line of the body portion when the central axis of the body portion is substantially in the horizontal plane. In this manner, an inspector viewing the pipeline from above, can see the gland handle and the bell handle together to determine that the fitting and pipe have been assembled correctly.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENTS

Figure 1:
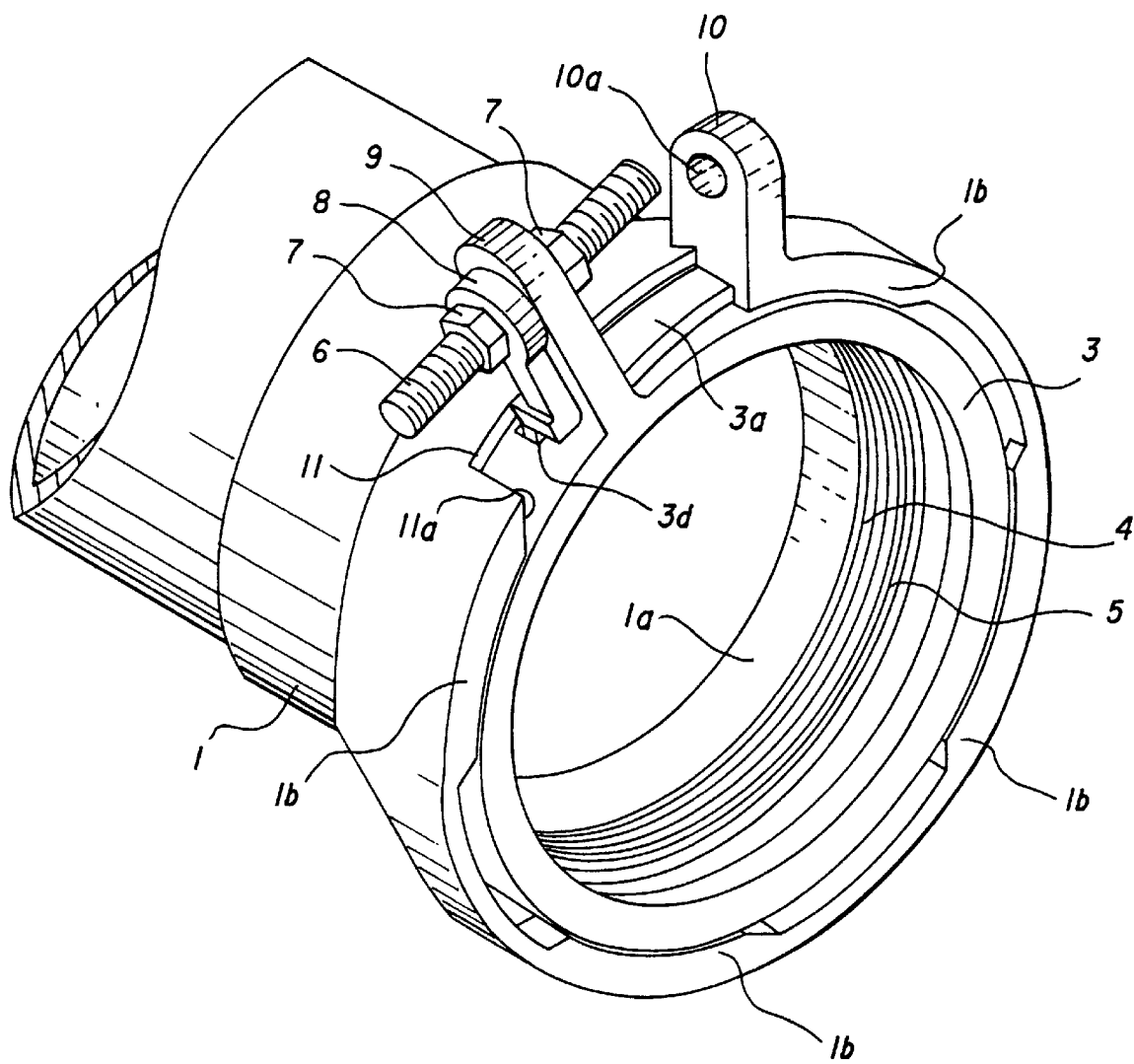
FIG. 1 is perspective view of the socket of the joint in the "Open" position as during shipment according to the present invention.
Figure 4:
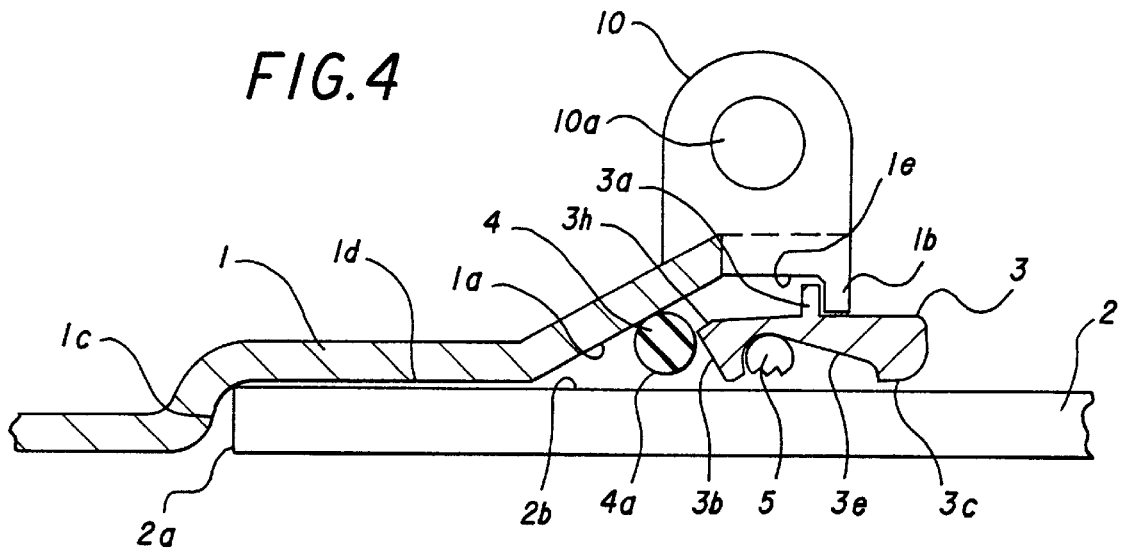
FIG. 4 is a cross-section of the joint cut through the vertical center line, with the gland ring in the "Open" position.

Referring to FIGS. 1 and 4, the preferred embodiment of the joint includes a bell socket 1, a pipe end 2, a gland ring 3, and a gasket 4. The gland ring and bell socket are preferably made of ductile iron. The socket has a conical surface 1a for holding a gasket prior to sealing and then acting as a gasket seat during sealing, a first cylindrical surface 1d of smaller diameter extending from one end of the conical surface extending to a bottom 1c for seating the end of the pipe, and a second cylindrical surface 1e, of larger diameter extending from the other end of the conical surface. The second cylindrical surface of the socket has internal segments 1b of a breech lock mechanism. The gland ring 3 is provided having the external segments 3a of the breech lock mechanism cooperating with the internal segments 1b of the breech lock mechanism in the socket 1. The gasket 4 is present between the gland ring 3 and the conical surface 1a. The segments 1b, 3a of the breech lock mechanism are each formed as a wedge or inclined plane surface and are sloped at a specific angle. The particular angle is selected based upon the amount of axial movement desired for the gland ring. For example, the preferred angle relative to a circumferential line for an eight-inch diameter fitting is 9.25°. Such an angle produces a ½-inch axial travel for a 45° (⅛) turn of the gland ring relative to the socket.

Figure 6:
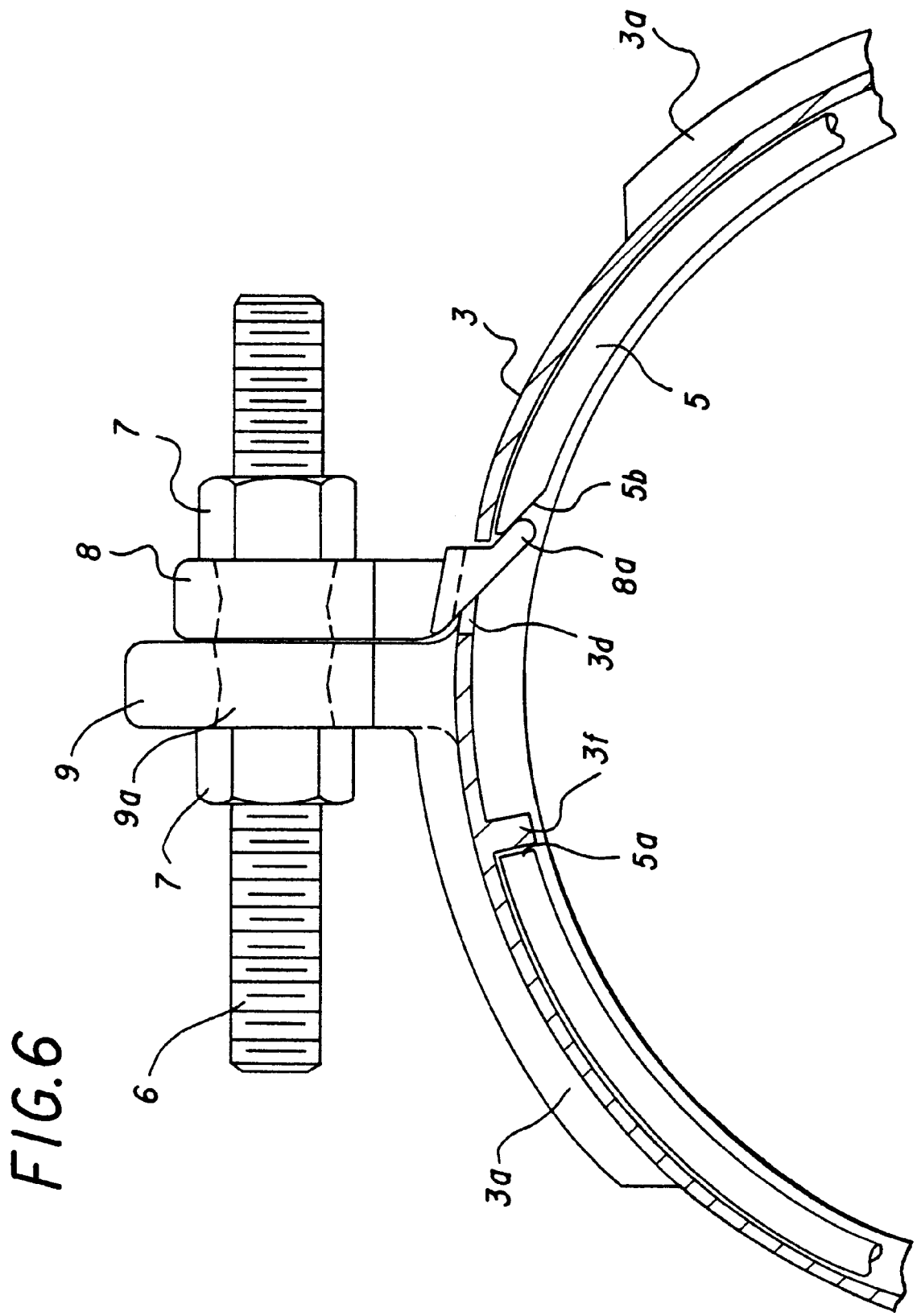
FIG. 6 is a cross-section through the gland ring cut at the maximum diameter of the internal tapered cavity containing the grip ring.

The gland ring 3 is provided with a means for rotating the ring relative to the socket 1. As shown in FIGS. 1 and 6, the gland ring 3 is provided for this function in the most preferred embodiment with a handle 9 protruding in one or more locations radially from the gland surface. The socket 1 is also provided with one or more radially extending handles 10 in one or more locations to cooperate with the handle or handles 9 on the gland ring 3. Adjacent the handle 10 on the socket 1 is a cut-out rectangular section 11 made in the second cylindrical section defining the second cylindrical surface. The gland ring handle 9 extends radially out through the cut-out section when the gland ring 3 is assembled with the socket 1. Each set of cooperating handles 9 and 10, consisting of one socket handle and one gland ring handle, is provided with bolt holes 9a and 10a extending along a tangent of the joint and an assembly bolt 6 for bringing the handles together. Preferably, the handle 9 is longer than handle 10 allowing a hammer to be used to rotate the gland ring in, for example, the clockwise direction to tighten the joint, and in the counterclockwise direction to disassemble the joint. Alternatively, the gland ring can be extended axially and any one of a variety of engageable surfaces or members can be provided to enable rotation of the ring. For example, the ring can have facets like a hex-nut, knurling to assist engagement by a strap or band, axially extending fingers, or the like. The members or surfaces can be engaged and manipulated by standard tools, such as a wrench, or by specialty tools designed solely for that purpose. However, as noted above, the most preferred structure is the radially extending gland handle 9.

The gland ring 3 is placed into the socket 1 with the gland ring handle 9 extending radially through the cut-out section 11. The gland ring 3 is rotated slightly in the clockwise direction, for example, to cause its breech lock segments 3a to interact or interlock with the breech lock segments 1b in the socket and the gland ring end face 3b to contact and engage the gasket 4 as described below. This holds the gland ring 3 in the socket 1 in a loose condition. The gland ring 3 is securely held in this position, during shipment and prior to insertion of the pipe end 2, by a temporary "spacer/spreader" 8 located at the gland ring handle 9 on the "opening" side thereof. In the case where the gland ring is rotated clockwise to tighten, the "opening" side would be the counter-clockwise side of the handle 9. The spacer/spreader 8 is held on the handle 9 during shipment and assembly by an assembly bolt 6. The spacer/spreader 8, bolted to the gland ring handle 9, prevents the breech lock gland ring 3 from rotating to a position so that it can be removed from the socket 1. That is, the spacer/spreader 8 functions as a spacer large enough so that the breech lock segments 3a cannot completely disengage from the segments 1b. This axially holds the gland ring 3 on the socket 1. Thus the spacer/spreader 8 retains the gland ring 3 securely in the socket 1 during shipment. This spacer/spreader 8 may also have a nut socket formed therein to prevent rotation of the assembly bolt nut 7 during tightening.

Referring to FIGS. 1 and 4, the gasket 4 is looped like a push-on gasket and placed into the socket, on the tapered conical gasket seat 1a. The gasket 4 is compressed in the circumferential direction by pushing it into place. The circumferential compression applies enough force to cause the gasket 4 to roll up the incline of the conical surface 1a and press the gasket 4 against the gland ring end face 3b. The "pre-compressed" gasket 4 forces the gland ring 3 axially outward about ½ inch until the gland ring breech lock segments 3a axially contact the socket breech lock segments 1b, thus keeping the gland ring 3 in the "open" position ready to receive the pipe end 2a. This also makes the entire assembly stable for shipment.

In the "open" position, FIGS. 1 and 4, the inside diameter and inside circumference 4a of the installed gasket 4 are greater than the inside diameter and inside circumference 3c of the gland ring 3. Both the inside diameter and inside circumference 4a of the installed gasket 4 and the inside diameter and inside circumference 3c of the gland ring 3 are greater than the outside diameter and circumference 2b of the pipe end 2.

Figure 2:
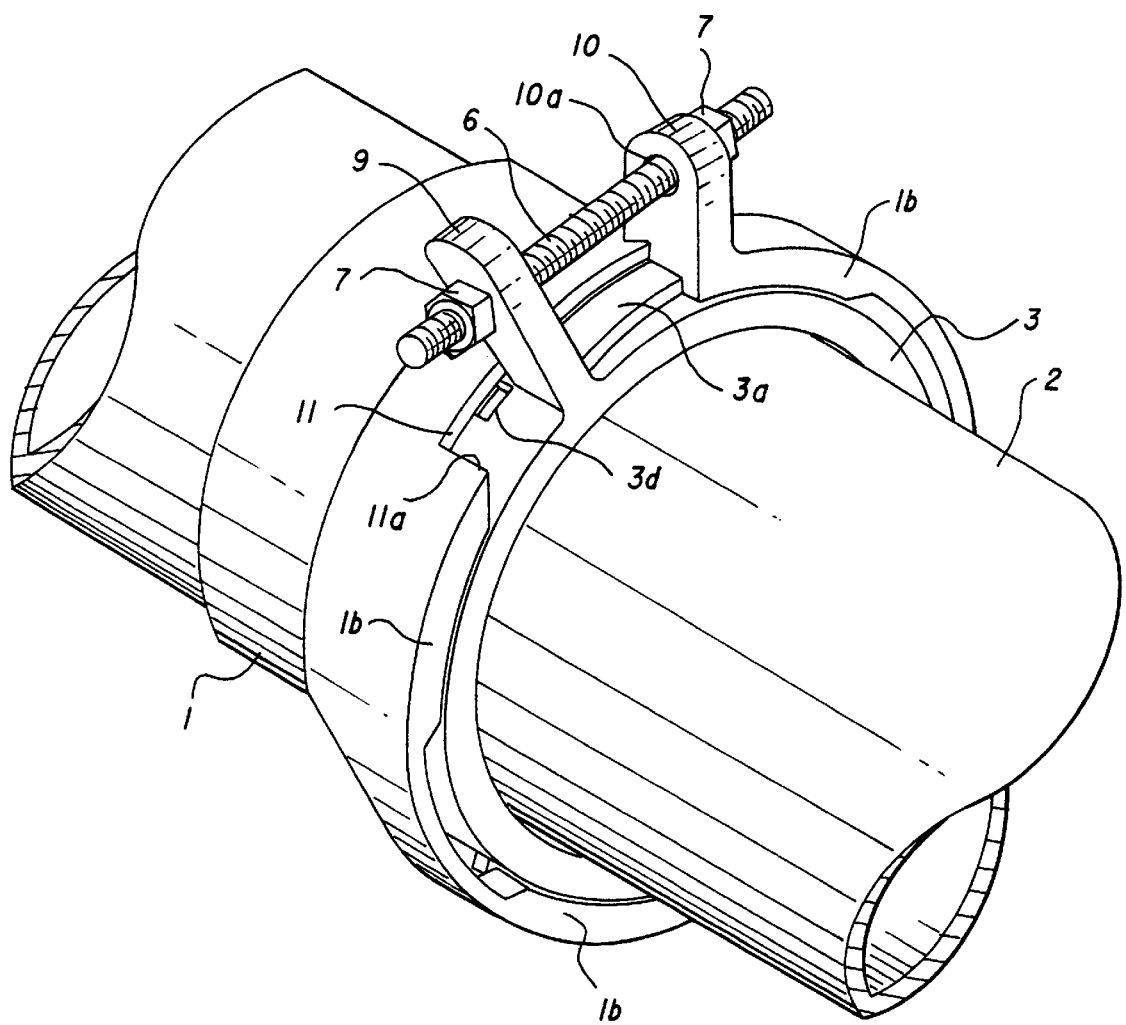
FIG. 2 is a perspective view of the socket of the joint with the pipe end inserted and the assembly bolt ready to be tightened.
Figure 3:
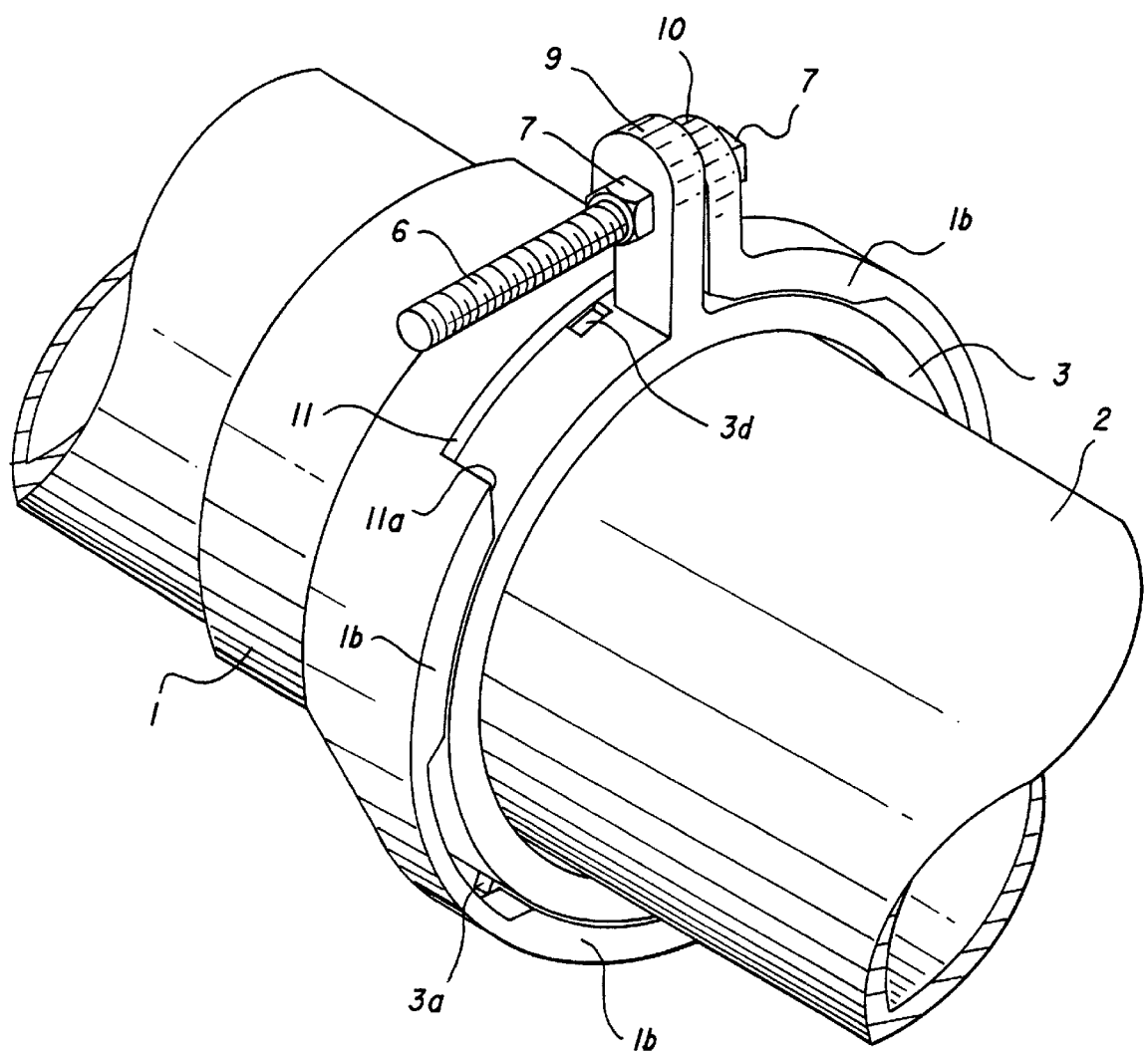
FIG. 3 is perspective view of the joint in the "Closed" position completely assembled.
Figure 5:
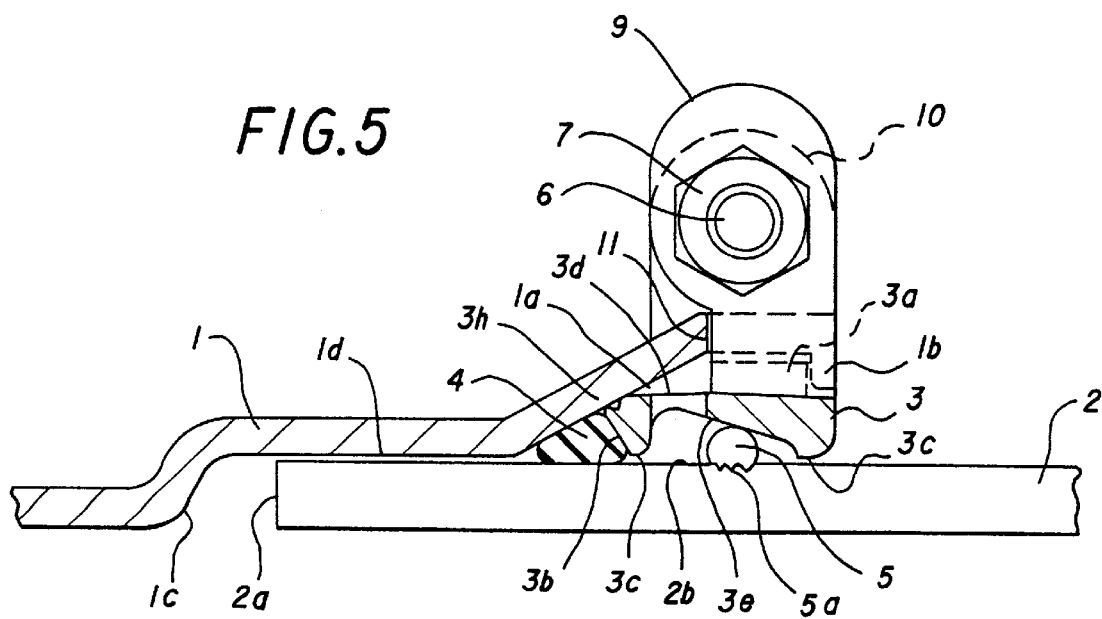
FIG. 5 is a cross-section of the joint through the vertical center line in the "Closed" position after internal pressure has caused the grip to penetrate the surface of the pipe end.

Upon receipt of the fitting, the worker removes the gasket 4 and cleans the socket 1 and plain end of the pipe 2. The gasket 4 is then lubricated and placed back into its original position in the socket insuring that it is against the gland front surface 3b. No bevel is required on the pipe end 2a. The un-bevelled pipe end 2a is simply inserted by hand into the socket 1 through the gland ring 3 and gasket 4 without touching the gasket. Again, this can be accomplished easily, because, in the "open" position, the gasket inside diameter 4a is larger than the gland inside diameter 3c and the pipe surface 2b rides on the gland ring surface 3c during assembly. The pipe is inserted until it touches the bottom 1c of the socket. The assembly bolt 6 is loosened and the spacer/spreader 8 removed. The assembly bolt 6 is then inserted into bolt holes 9a and 10a in the handles (FIG. 2) and is tightened until the handles 9 and 10 touch (FIG. 3). Referring to FIG. 5, the initial tightening of the assembly bolt 6 rotates the gland ring breech lock segments 3a against the socket breech lock segments 1b, and moves the gland ring 3 axially forward. The forward motion of the gland ring 3, against the O-ring gasket 4, causes the gasket 4 to roll down the tapered gasket seat 1a, out of its "open" position, (touching only the gland ring end face 3b and gasket seat 1a of the socket), and into its "closed" position (touching the gland ring end face 3b, gasket seat 1a and pipe surface 2b). Further rotation and forward axial movement of the gland ring 3 deflects the O-ring 4 in its now completely formed, confined annular space, between pipe surface 2b, fitting gasket seat 1a, and gland ring end face 3b sealing the joint. The amount of deflection in the gasket 4 is governed by the tolerance of the castings, the size of the gasket 4 and position of the gland ring 3 only, not by the amount of torque on the bolt 6. The most advantageous combination has the gasket 4 deflected in the sealing position approximately 30% of its original cross-sectional diameter.

In its preferred dimensions, the extreme forward outer rim of the gland 3h adjacent the gland end face 3b as shown in FIG. 5 contacts the tapered gasket seat 1a of the socket thereby centering the gland 3 in the socket. In such a structure, the conical surface of the socket can have a taper of substantially 30° from the axis of the fitting while the gland end face 3b can have a taper of substantially 30° from a plane perpendicular to the axis of the fitting. The exact angles of the tapers referred to above are not made with super precision and consequently, are approximate. When the two surfaces abut generally forming a right angle, the O-ring is compressed substantially 30%.

The pipe diameter 2b, the socket diameter 1d, and the gland diameter 3c govern the deflection of the O-ring 4, eliminating any additional problem of the offset of the gland ring 3 in the socket 1 which would tend to exaggerate the offset of the pipe end 2 in the socket 1. Thus, the gasket deflection is governed by the same dimensions as in a push-on joint, having no separate gland ring.

As stated above, as the gland ring 3 moves axially forward, the end face 3b pushes the gasket 4 down the tapered gasket seat 1a. In the case of the preferred embodiment, the gasket 4 is an O-ring, round in cross-section. Consequently, the O-ring gasket rolls down the conical surface 1a being compressed in the circumferential direction at the same time. This rolling action reduces friction and hence, the force required to push the gasket 4 into position. This gasket rolling continues until the gasket 4 is touching the surface of the pipe 2b. In the eight-inch prototype of the present invention, the movement to this point can be accomplished by moving the gland ring 3 by hand. The final deflection of the gasket 4 is accomplished by continuing to tighten the assembly bolt 6 until the handles 9 and 10 touch.

This final axial movement of the gland ring 3 caused by the rotation thereof until the handles 9 and 10 touch can also be achieved by impacting the gland ring handle 9 with a hammer.

Thus, the seal is accomplished, with a simple wrench (and/or hammer) and one bolt. No beveling, no special rigging, no special skill or strength is required to tighten multiple bolts. In addition, the complete unit is shipped assembled, eliminating lost parts during shipment.

Disassembly is accomplished by rotating the gland ring 3 in a counter-clockwise direction by applying a force, usually by impacting with a hammer, to gland ring handle 9 which is preferably longer than socket handle 10 for this purpose. As the gland ring 3 is rotated counter-clockwise, the breech lock segments 3a of the gland ride on the segments 1b of the socket 1, while the gasket 4 rolls up the incline of conical surface 1a releasing its seal on the pipe end surface 2b. The pipe end 2 can now be removed from the socket 1.

The handles 9 and 10, when the joint is fully assembled, are preferably located at the top of the vertical center line of the joint when the central axis of the joint is in a horizontal plane. As a fitting in a pipeline, when the pipeline is in a substantially horizontal plane especially when the change in direction of the pipeline is in the horizontal plane, the handles by being at the top of the vertical center line of the joint are located in an excellent assembly position. This location is unique. If the handles 9 and 10 are located in this position, then regardless of the direction the pipeline is required to turn (right, left, up, or down), the fitting can be placed so that the handles are either on its top or on its side. In either case, they are in plain view from the top of the trench within which the pipeline is laid. The bolt 6 and nuts 7 can be tightened without reaching under the pipe. An inspector can determine from the top of the trench that it has been assembled correctly.

The handles 9 and 10 (FIGS. 1, 2, and 3) preferably are also in such position on the breech lock gland ring 3 and socket 1 of the fitting that they extend radially from the center line of the joint in a plane located slightly inside the bell of the fitting, so that the thrust provided by the bolt 6 for assembly, pulls in the same plane. This requires a cut-out rectangular section 11 to be removed from the otherwise continuous cylinder of the fitting bell. This cut-out or open section 11 is located with one end touching the vertical center line of the fitting when the change in direction of the pipeline is in the horizontal plane. The handle 10, located on the fitting bell, is also located at the aforementioned center line, and is the end of the breech lock movement which consummates the assembly process. In this preferred arrangement, the spacer/spreader 8 extends into the cut-out section 11 and is engaged by an edge 11a thereof with the joint in the assembled shipping configuration.

The most preferred embodiment of the present invention also provides for thrust restraint. With this joint, thrust restraint involves the use of the breech lock gland ring 3. Referring to FIGS. 4 and 5, in the most preferred embodiment, an annular cavity 3e is provided on the inside circumferential surface of the gland ring 3. The annular cavity 3e is larger in diameter toward the end face 3b end of the ring 3 (the side of the ring which touches the gasket) and tapering toward a smaller diameter at the rear of the breech lock gland ring.

A grip ring 5 is inserted into this tapered cavity 3e. The grip ring 5 is split circumferentially at one location only. This grip ring 5 is preferably round in cross-section and has axially spaced, thread-like teeth 5c on an inside circumferential surface. The teeth 5c have a tapered surface on the back (towards the outside of the joint) and a perpendicular surface on the front (towards the gasket) as in a buttress thread, causing the entrance of the pipe end 2a to be easy and the removal thereof to be difficult. The grip ring 5 has appropriate portions color coded to ensure correct orientation during initial installation.

The grip ring 5, in a relaxed condition, has an inner diameter preferably slightly smaller in diameter than the outer diameter of the smallest pipe (minimum tolerance) on which it is to be used. The grip ring 5 can be made of steel and, most preferably, is made of stainless steel.

Referring to FIG. 6, the breech lock gland ring 3 contains a circumferentially elongated "through hole" or slot 3d from the inside of the cavity 3e to the outside, located in the largest inside diameter portion of the cavity 3e and next to the gland ring handle 9. Also, inside the cavity 3e is an axially oriented, radially extending rib 3f formed as an integral part of the breech lock gland ring casting. Referring to FIG. 1, when assembled, the slot 3d is located adjacent the cut-out section 11 of the second cylindrical section of the socket 1 in a "thrust restrained" gland ring, such that the spacer/spreader 8 can be inserted to retain the grip ring 5 in the expanded position prior to assembly.

One end of the split grip ring 5a is flat (perpendicular to the axis of the grip ring) and is located against the rib 3f. The other end of the split grip ring 5b is tapered and is positioned under the through hole or slot 3d when the ring is in place. The spacer/spreader 8 described above, is located on the handle 9 held in place by the assembly bolt 6 and nuts 7. The spacer/spreader 8 can further include spreader end portion 8a which extends through the slot 3d and hooks the tapered end 5b of the split grip ring 5. The hooking and holding of the tapered end 5b by the spreader end portion 8a while the opposite end of the ring is held against the rib 3f forces the ring into an expanded condition, wherein the inside diameter of the grip ring 5c is larger than the inside diameter 3c of the breech lock gland ring 3 and consequently the outside diameter of the pipe end 2. This allows passage of the pipe end 2a through the grip ring 5 and the gland ring 3 without touching. The flat end surface 5a against the rib 3f and the tapered surface 5b at the hook 8a also helps orient the grip ring so that the teeth 5c are in the correct direction to facilitate entry and impede exit of the pipe end 2. The spacer/spreader 8 spreads the grip ring 5 by a simple pulling lever action at the handle 9 by the bolt 6 and nuts 7. The pivot point for this simple pulling lever action is substantially adjacent the base of the handle 9.

After insertion of the pipe end 2a into the joint, the breech lock gland ring 3 is moved as far as possible in the clockwise direction by hand to have the breech lock segments 1b and 3a engage further and draw the gland ring 3 into the socket 1. The nut 7 is removed from the bolt 6, releasing the spacer/spreader 8. The spacer/spreader 8 is removed and discarded. The grip ring 5 closes by spring action and grips the pipe surface 2b. The breech lock gland ring 3 is rotated to its final position either with the assembly bolt 6 or with a hammer and then bolt 6 and nut 7 are tightened until the handles 9 and 10 touch. The circumferential tightening of the gland ring moving the same axially of the joint causes the sloping annular cavity 3e of the gland ring 3 to engage the grip ring 5 and force the teeth 5c into the outer surface of the pipe end 2.

As internal pressure is applied to the pipeline, the pipe end 2 tries to move out of the socket 1 and by doing so, moves the grip ring 5 further down the sloping annular cavity 3e, intensifying its grip and creating parallel circumferential grooves on the outside surface of the pipe 2b, preventing separation.

Disassembly is accomplished by rotating the gland ring 3 in a counter-clockwise direction by applying a force to gland ring handle 9, usually by impacting it with a hammer. Handle 9 is preferably longer than socket handle 10 for just this purpose. As the gland ring 3 is rotated counter-clockwise, the breech lock segments 3a of the gland ride on the segments 1b of the socket I moving the gland ring axially of the pipe, while the gasket 4 rolls up the incline of conical surface 1a releasing its seal on the pipe end surface 2b. The pipe end 2 with the gland ring 3 still held in place by the grip ring 5 can now be removed from the socket 1. The gland ring 3 is rotated counter-clockwise around the pipe until the rib 3f is felt to abut against the flat end 5a of the grip ring 5 and the tapered end 5b is visible through the slot 3d. The gland ring 3 is now removed from the pipe end 2 by re-inserting the spacer/spreader 8 into the through hole 3d, hooking the tapered end 5b of the grip ring 5 with the spreader end portion 8a, and drawing the spacer/spreader 8 back to its original position using the assembly bolt 6 to tighten the spacer/spreader against the handle 9. The spreader end portion 8a engages the tapered end of the grip ring 5 and moves the same both circumferentially and radially. The circumferential movement of the tapered end 5b with the flat end 5a abutted on the radially extending rib 3f forces the grip ring 5 to expand and release from the pipe end 2a. The grip ring 5 is now in its expanded position and the grip ring and the gland ring can be removed from the pipe end 2.

The present invention can also include alternatives for thrust restraint. Multiple, individually actuated wedges or special lugs can be provided on the axially outer face of the gland ring 3 angled towards the gland ring and engaging the pipe surface. In a similar structure, multiple, individual set screws can be provided on the axially outer face of the gland ring 3. These can be either radially straight with respect to the pipe or can be angled towards the gland ring 3. Both of these are less desirable than the grip ring 5, since individual tightening and adjustment of the devices to specified torques are needed. The grip ring 5 can be shaped differently than the preferred embodiment of a round cross-section with axially spaced, thread-like teeth 5c on an inside circumferential surface. That is, the grip ring 5 can be triangular or trapezoidal in cross-section with plural teeth on an inner surface to engage the pipe surface.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A pipe joint for connecting a plain pipe end comprising:
a bell with a socket defined therein, said socket including an axis, a conical surface, a first cylindrical surface of smaller diameter extending from one end of the conical surface, a bottom of said socket adjacent said first cylindrical surface for seating the pipe end, and a second cylindrical surface of larger diameter extending from the other end of the conical surface;
a gasket disposed adjacent said conical surface prior to sealing, said conical surface acting as a gasket seat during sealing of said gasket;
a gland having a means for rotating said gland from outside said bell;
a breech lock mechanism including internal segments on said second cylindrical surface of said socket and corresponding, cooperating external segments on said gland, said internal and external segments having matching, mirrored inclined plane surfaces for engagement with each other;
wherein with engagement of said inclined surfaces of said internal and external segments of said breech lock mechanism, rotation of said means causes axial movement of said gland relative to said socket.

2. The pipe joint according to claim 1, wherein said means for rotating said gland from outside said bell comprises a radially extending handle.

3. The pipe joint according to claim 2, further comprising a radially extending handle on said bell positioned such that at a fully engaged position of said breech lock mechanism, said gland handle abuts said bell handle.

4. The pipe joint according to claim 3, wherein said gland handle extends further radially than said bell handle.

5. The pipe joint according to claim 3, wherein said means for rotating said gland from outside said bell further comprises a circumferentially extending cut-out in said second cylindrical surface of said bell, and said gland handle extends radially through said cut-out, said cut-out being positioned adjacent said bell handle.

6. The pipe joint according to claim 2, wherein said means for rotating said gland from outside said bell further comprises a circumferentially extending cut-out in said second cylindrical surface of said bell, and said gland handle extends radially through said cut-out.

7. The pipe joint according to claim 5, further comprising a spacer/spreader attached to said gland handle and engaging a surface of said cut-out, said spacer/spreader being sized sufficiently in a circumferential direction of said bell to prevent said breech lock mechanism from being disengaged.

8. The pipe joint according to claim 1, wherein said gasket is an O-ring, said O-ring having an outside diameter about the same as an inside diameter of said second cylindrical surface of said socket, whereupon assembly of said joint, said O-ring is pre-compressed and forces the gland axially outward until the external segments on the gland axially contact the internal segments of the socket, keeping the gland in an open position ready to receive the pipe end.

9. The pipe joint according to claim 8, wherein said O-ring has an inside diameter and inside circumference greater than an inside diameter and inside circumference of the gland.

10. The pipe joint according to claim 8, wherein said conical surface of the socket has a taper of substantially 30° from the axis of said socket, said gland has a gland end face at an end adjacent said conical surface, said gland end face having a taper of substantially 30° from a plane perpendicular to the axis of said socket, said conical surface and said gland end face when abutting form a right angle and said gasket seat, the O-ring being compressed substantially 30% in said gasket seat.

11. The pipe joint according to claim 1, wherein said gland has an annular cavity on an inside circumferential surface of the gland, said annular cavity being larger in diameter toward an end face of the gland and tapering toward a smaller diameter at the rear of the gland, and said joint further comprises a grip ring inserted into said annular cavity, said grip ring being split circumferentially at one location only.

12. The pipe joint according to claim 11, wherein grip ring is round in cross-section and has axially spaced, thread-like teeth on an inside circumferential surface, said teeth having a tapered surface on a side towards the outside of the joint and a perpendicular surface on the opposite axial side.

13. The pipe joint according to claim 11, wherein said gland has a radially extending gland handle and a circumferentially extending slot therein adjacent said gland handle, said annular cavity has a stop member therein, one end of said grip ring resting against said stop member and the other end being positioned under said slot when the ring is in place, said joint further comprises a spacer/spreader attached to said gland handle and extending into said slot engaging said other end of said grip ring for expanding said grip ring.

14. The pipe joint according to claim 13, wherein said stop member is an axially oriented, radially extending rib formed as an integral part of the gland, said one end of said grip ring being in a radial plane of the grip ring and positioned against the rib.

15. The pipe joint according to claim 13, wherein said other end of the grip ring is tapered and said spacer/spreader has a spreader end portion which extends through the slot and hooks the tapered end of the grip ring.

16. A pipe joint for connecting a plain pipe end according to claim 1, wherein said socket, said gasket, and said gland are sized and shaped to compress said gasket against a surface of the plain pipe end to seal said joint in a series of steps comprising:
providing the joint in a pre-assembled condition at a position to be connected to the pipe end;
removing said gasket from said joint and lubricating said gasket;
replacing said gasket to adjacent said conical surface;
inserting the plain pipe end in through said gland and gasket into said bell and seating said end on said bottom of said socket;
rotating said means causing axial movement of said gland relative to said socket, said gland engaging said gasket and causing said gasket to roll down said conical surface along said surface of the plain pipe end, further axial movement of said gland relative to said socket deflecting said gasket into a confined annular space defined by the pipe surface, said conical surface and an end face of said gland and compressing said gasket to seal said joint.

17. A pipe joint for connecting a plain pipe end comprising:
a bell with a socket defined therein, said socket including an axis, a conical surface, a first cylindrical surface of smaller diameter extending from one end of the conical surface, a bottom of said socket adjacent said first cylindrical surface for seating the pipe end, and a second cylindrical surface of larger diameter extending from the other end of the conical surface;

a gasket disposed adjacent said conical surface prior to sealing, said conical surface acting as a gasket seat during sealing of said gasket;

a gland having a radially extending handle;

a breech lock mechanism including internal segments on said second cylindrical surface of said socket and corresponding, cooperating external segments on said gland, said internal and external segments having matching, mirrored inclined plane surfaces for engagement with each other;

wherein with engagement of said inclined surfaces of said internal and external segments of said breech lock mechanism, rotation of said handle causes axial movement of said gland relative to said socket;

a radially extending handle on said bell positioned such that at a fully engaged position of said breech lock mechanism, said gland handle abuts said bell handle;

wherein said bell has a circumferentially extending cut-out in said second cylindrical surface, and said gland handle extends radially through said cut-out, said cut-out being positioned adjacent said bell handle;

a spacer/spreader attached to said gland handle and engaging a surface of said cut-out, said spacer/spreader being sized sufficiently in a circumferential direction of said bell to prevent said breech lock mechanism from being disengaged;

wherein said gland has an annular cavity on an inside circumferential surface of the gland, said annular cavity being larger in diameter toward an end face of the gland and tapering toward a smaller diameter at the rear of the gland; and a grip ring inserted into said annular cavity, said grip ring being split circumferentially at one location only;

wherein said gland has a circumferentially extending slot therein adjacent said gland handle, said annular cavity has a stop member therein, one end of said grip ring resting against said stop member and the other end being positioned under said slot when the ring is in place, and said spacer/spreader extends into said slot engaging said other end of said grip ring for expanding said grip ring.

18. The pipe joint according to claim 17, wherein said gland handle extends further radially than said bell handle.

19. The pipe joint according to claim 17, wherein said gasket is an O-ring, said O-ring having an outside diameter about the same as an inside diameter of said second cylindrical surface of said socket, whereupon assembly of said joint, said O-ring is pre-compressed and forces the gland axially outward until the external segments on the gland axially contact the internal segments of the socket, keeping the gland in an open position adapted to receive the pipe end.

20. The pipe joint according to claim 19, wherein said O-ring has an inside diameter and inside circumference greater than an inside diameter and inside circumference of the gland.

21. The pipe joint according to claim 19, wherein said conical surface of the socket has a taper of substantially 30° from the axis of said socket, said gland has a gland end face at an end adjacent said conical surface, said gland end face having a taper of substantially 30° from a plane perpendicular to the axis of said socket, said conical surface and said gland end face when abutting form a right angle and said gasket seat, the O-ring being compressed substantially 30% in said gasket seat.

22. The pipe joint according to claim 17, wherein grip ring is round in cross-section and has axially spaced, thread-like teeth on an inside circumferential surface, said teeth having a tapered surface on a side towards the outside of the joint and a perpendicular surface on the opposite axial side.

23. The pipe joint according to claim 17, wherein said stop member is an axially oriented, radially extending rib formed as an integral part of the gland, said one end of said grip ring being in a radial plane of the grip ring and positioned against the rib.

24. The pipe joint according to claim 17, wherein said other end of the grip ring is tapered and said spacer/spreader has a spreader end portion which extends through the slot and hooks the tapered end of the grip ring.

25. A pipe fitting for connecting a plain pipe end, said fitting comprising a body portion and at least one joint, said joint comprising:

a bell with a socket defined therein, said socket including a conical surface, a first cylindrical surface of smaller diameter extending from one end of the conical surface, a bottom of said socket adjacent said first cylindrical surface for seating the pipe end, and a second cylindrical surface of larger diameter extending from the other end of the conical surface;

a gasket disposed adjacent said conical surface prior to sealing, said conical surface acting as a gasket seat during sealing of said gasket;

a gland having a radially extending handle;

a breech lock mechanism including internal segments on said second cylindrical surface of said socket and corresponding, cooperating external segments on said gland, said internal and external segments having matching, mirrored inclined plane surfaces for engagement with each other;

wherein with engagement of said inclined surfaces of said internal and external segments of said breech lock mechanism, rotation of said handle causes axial movement of said gland relative to said socket; and a radially extending handle on said bell positioned such that at a fully engaged position of said breech lock mechanism, said gland handle abuts said bell handle;

wherein said body portion having vertical center line and central axis;

said gland handle and said bell handle, when the joint is fully assembled, being positioned at a top of the vertical center line of the body portion when the central axis of said body portion is substantially in a horizontal plane.

26. A pipe fitting for connecting a plain pipe end, said fitting comprising a body portion and at least two joints, each said joint comprising:

a bell with a socket defined therein, said socket including a conical surface, a first cylindrical surface of smaller diameter extending from one end of the conical surface, a bottom of said socket adjacent said first cylindrical surface for seating the pipe end, and a second cylindrical surface of larger diameter extending from the other end of the conical surface;

a gasket disposed adjacent said conical surface prior to sealing, said conical surface acting as a gasket seat during sealing of said gasket;

a gland having a radially extending handle;

a breech lock mechanism including internal segments on said second cylindrical surface of said socket and corresponding, cooperating external segments on said gland, said internal and external segments having matching, mirrored inclined plane surfaces for engagement with each other;

wherein with engagement of said inclined surfaces of said internal and external segments of said breech lock mechanism, rotation of said handle causes axial movement of said gland relative to said socket; and a radially extending handle on said bell positioned such that at a fully engaged position of said breech lock mechanism, said gland handle abuts said bell handle;

wherein said body portion of said fitting has vertical center line and central axis;

said gland handles of said at least two joints and said bell handles, when the joints are fully assembled, being positioned at a top of the vertical center line of the body portion when the central axis of said body portion is substantially in a horizontal plane.

27. In a pipeline extending in a substantially horizontal plane, said pipeline including a pipe having plain ends, and at least one pipe fitting for connecting to one of the plain pipe ends, the improvement comprising said fitting comprising a body portion and at least one joint, said joint comprising:

a bell with a socket defined therein, said socket including a conical surface, a first cylindrical surface of smaller diameter extending from one end of the conical surface, a bottom of said socket adjacent said first cylindrical surface for seating the pipe end, and a second cylindrical surface of larger diameter extending from the other end of the conical surface;

a gasket disposed adjacent said conical surface prior to sealing, said conical surface acting as a gasket seat during sealing of said gasket;

a gland having a radially extending handle;

a breech lock mechanism including internal segments on said second cylindrical surface of said socket and corresponding, cooperating external segments on said gland, said internal and external segments having matching, mirrored inclined plane surfaces for engagement with each other;

wherein with engagement of said inclined surfaces of said internal and external segments of said breech lock mechanism, rotation of said handle causes axial movement of said gland relative to said socket; and a radially extending handle on said bell positioned such that at a fully engaged position of said breech lock mechanism, said gland handle abuts said bell handle;

wherein said body portion of said fitting has vertical center line and central axis;

said gland handle of said joint and said bell handle, when the at least one joint is fully assembled, being positioned at a top of the vertical center line of the body portion when the central axis of said body portion is substantially in said horizontal plane, whereby an inspector viewing said pipeline from above, can see said gland handle and said bell handle together to determine that the fitting and pipe have been assembled correctly.

* * * * *